US007187760B2

(12) United States Patent
Brandt et al.

(10) Patent No.: US 7,187,760 B2
(45) Date of Patent: *Mar. 6, 2007

(54) SYSTEM AND METHOD FOR CREATING AND ACCESSING OUTGOING TELEPHONE CALL LOG

(75) Inventors: Jeffrey Lewis Brandt, Cedar Park, TX (US); Bojana Mamuzic, San Antonio, TX (US); James Thomas Miller, Austin, TX (US); Stephen Mark Mueller, Austin, TX (US)

(73) Assignees: AT&T Labs, Inc., Austin, TX (US); AT&T Services, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/106,522

(22) Filed: Apr. 15, 2005

(65) Prior Publication Data

US 2005/0190907 A1 Sep. 1, 2005

Related U.S. Application Data

(63) Continuation of application No. 09/917,747, filed on Jul. 31, 2001, now Pat. No. 6,904,137.

(51) Int. Cl.
*H04M 15/00* (2006.01)
(52) U.S. Cl. .................. 379/126; 379/116; 379/119
(58) Field of Classification Search ................ 370/352, 370/353; 379/112.01, 114.01, 114.03, 114.28, 379/114.29, 116, 119, 121.04, 126, 127.01, 379/230
See application file for complete search history.

(56) References Cited

U.S. PATENT DOCUMENTS

| 5,146,490 A | 9/1992 | Beckman |
| 5,398,279 A | 3/1995 | Frain |
| 5,568,546 A | 10/1996 | Marutiak |
| 5,592,546 A | 1/1997 | Takahashi |
| 5,734,706 A | 3/1998 | Windsor et al. |
| 5,850,433 A * | 12/1998 | Rondeau ................ 379/218.01 |
| 5,903,632 A | 5/1999 | Brandon |
| 5,940,484 A | 8/1999 | DeFazio et al. |
| 5,940,486 A | 8/1999 | Defazio et al. |

(Continued)

FOREIGN PATENT DOCUMENTS

EP  0930761  7/1999

(Continued)

*Primary Examiner*—Bing Q. Bui
(74) *Attorney, Agent, or Firm*—Greenblum & Bernstein P.L.C.

(57) ABSTRACT

Outgoing call log data associated with a call from a subscriber's terminal is provided by a system including a switch, which receives the call from the subscriber's terminal and launches a query in response to the call, and a service controller, which receives the query and forwards call data to an interface server in response to the query. The switch continues to process the telephone call after querying the service controller. The interface server obtains additional information from a directory database based on at least the received call data. An outgoing call log database receives and stores the call data and the additional information from the interface server as the outgoing call log data. A web server retrieves the outgoing call log data from the outgoing call log database, in response to a query from a web client, and displays the outgoing call log data at the web client.

20 Claims, 5 Drawing Sheets

U.S. PATENT DOCUMENTS

| | | |
|---|---|---|
| 5,978,671 A | 11/1999 | Foladare et al. |
| 6,005,927 A | 12/1999 | Rahrer et al. |
| 6,018,571 A | 1/2000 | Langlois et al. |
| 6,100,873 A | 8/2000 | Bayless et al. |
| 6,118,859 A | 9/2000 | Giethoorn |
| 6,125,287 A | 9/2000 | Cushman et al. |
| 6,185,416 B1 | 2/2001 | Rudokas et al. |
| 6,385,301 B1 | 5/2002 | Nolting et al. |
| 6,459,779 B2 | 10/2002 | Wardin et al. |
| 6,470,079 B1 | 10/2002 | Benson |
| 6,639,975 B1 | 10/2003 | O'Neal et al. |

FOREIGN PATENT DOCUMENTS

| | | |
|---|---|---|
| JP | 11275204 | 10/1999 |

\* cited by examiner

SYSTEM AND METHOD FOR CREATING AND ACCESSING OUTGOING TELEPHONE CALL LOG

This application is a continuation of U.S. patent application Ser. No. 09/917,747, filed Jul. 31, 2001 now U.S. Pat. No. 6,904,137, the disclosure of which is expressly incorporated herein by reference in its entirety.

BACKGROUND OF THE INVENTION

1. Field of the Invention

The present invention relates to the field of telecommunications. More particularly, the present invention relates to automatically creating a log of outgoing telephone calls from a subscriber's telephone and storing outgoing call log data in a database, which is accessible by the subscriber over a data network for displaying the outgoing call log data and generating associated reports.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, the acronyms are defined as follows:
Advanced Intelligent Network (AIN)
Graphical User Interface (GUI)
Generic Data Interface (GDI)
HyperText Mark-Up Language (HTML)
HyperText Transfer Language Protocol (HTTP)
Java Database Conductivity (JDBC)
Lightweight Directory Access Protocol (LDAP)
Line Information Database (LIDB)
Off-Hook Delay (OHD)
Outgoing Call Log (OCL)
Open Database Connectivity (ODBC)
Personal Call Manager/Personal Communications Manager (PCM)
Personal Identification Number (PIN)
Public Switched Telephone Network (PSTN)
Service Control Point (SCP)
Service Switching Point (SSP)
Signaling System 7 (SS7)
Signaling Transfer Point (STP)
Transmission Control Protocol/Internet Protocol (TCP/IP)

3. Background Information

Presently, a number of advanced intelligent network (AIN) based telecommunications services enable dynamic interaction between the customers and their respective service accounts. Servers, databases, intelligent peripherals and other external data network elements interface with the public switched telephone network (PSTN) to process and store information created during routine handling of telephone calls. For example, names may be associated with incoming calling party numbers using an external directory database while the PSTN is processing the call. The name, telephone number and other call specific information may then be stored in an external database for access by the customer.

However, no service makes information related to outgoing telephone calls placed from a customer's telephone readily accessible to the customer for extensive processing and practical use. Although some present applications store outgoing telephone call data, the data is not used for detailed historical call tracking, report generation and other substantive processing. For example, in DEFAZIO et al., U.S. Pat. No. 5,940,484, outgoing call data automatically populates a telecommunications service related database. The database is subsequently used to increase the efficiency of associating names with incoming calls to the customer's telephone number, relying on the general theory that the parties called by the customer are the parties most likely to call the customer. The name database of DEFAZIO et al. is kept current by eliminating, for example, telephone numbers that have been changed with respect to a particular party or have not been called for an extended period of time.

DEFAZIO et al. does not teach, however, processing the outgoing call data to maintain a detailed historical record of outgoing calls or to enable generation of outgoing call reports. Furthermore, the data stored for each call is too general to enable any effective analysis. For example, DEFAZIO et al. simply retains the number of total calls to (and from) a particular telephone number and the date of the most recent call.

The present invention overcomes the problems associated with the prior art, as described below.

BRIEF DESCRIPTION OF THE DRAWINGS

The present invention is further described in the detailed description that follows, by reference to the noted plurality of drawings by way of non-limiting examples of preferred embodiments of the present invention, in which like reference numerals represent similar parts throughout several views of the drawings, and in which.

DETAILED DESCRIPTION OF EMBODIMENTS

Figure 1:
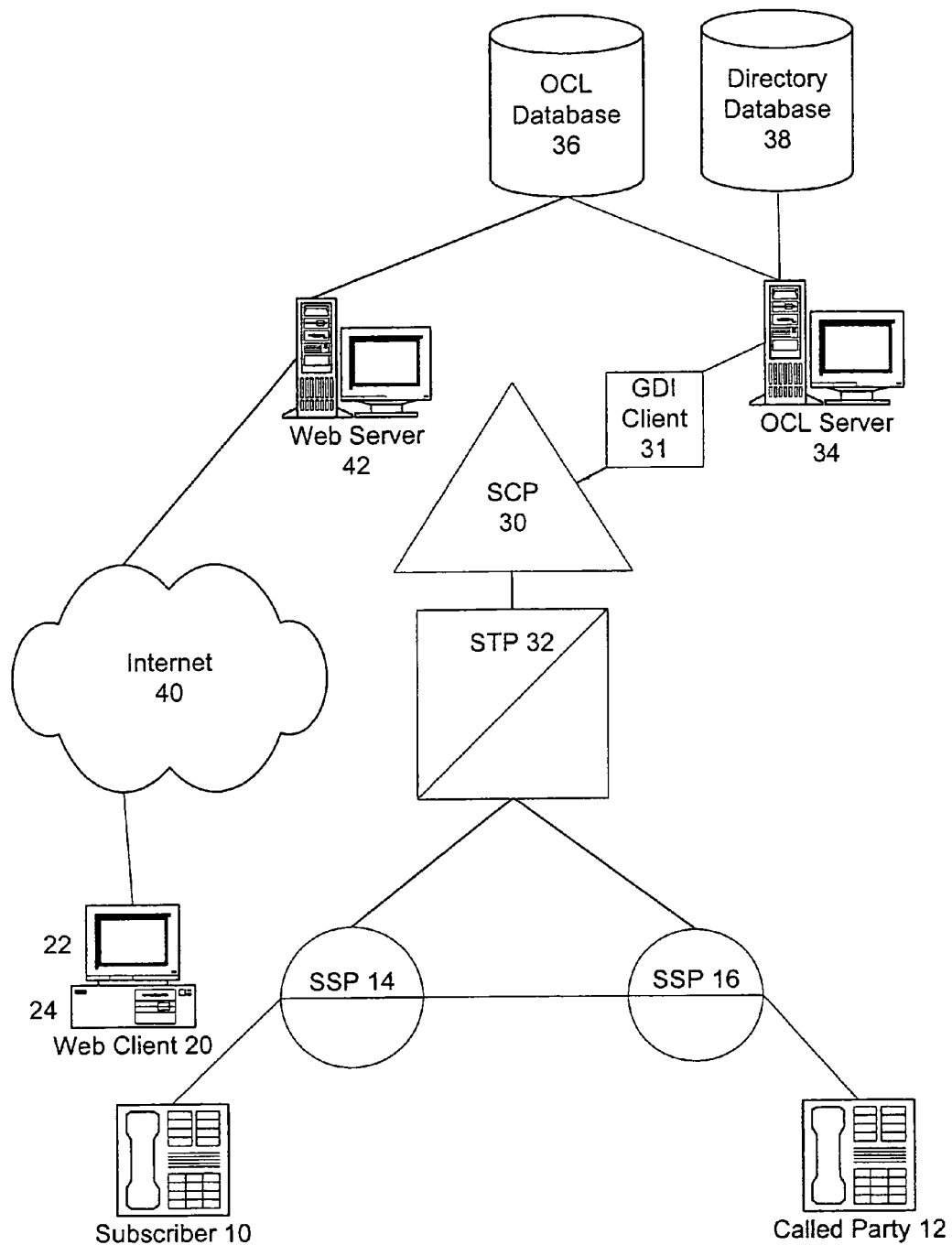
FIG. 1 is a block diagram illustrating system components, according to an aspect of the present invention.

In view of the above, the present invention through one or more of its various aspects and/or embodiments is presented to accomplish one or more objectives and advantages, such as those noted below.

An aspect of the present invention provides a system for providing outgoing call log data associated with a telephone call from a subscriber's telephone. The system includes a switch that receives the telephone call from the subscriber's telephone and a service control point that receives the query from the switch and forwards call data in response to the query. The switch includes an advanced intelligent network (AIN) trigger set to launch a query in response to the telephone call and may continue to process the telephone call after launching the query to the service control point. The system further includes an interface server that receives the call data from the service control point and obtains additional information from a directory database based on at least the received call data; an outgoing call log database that receives and stores the call data and the additional information from the interface server as the outgoing call log data; and a web server that retrieves the outgoing call log data from the outgoing call log database, in response to a query from a web client, and displays the outgoing call log data at the web client.

The call data received by the interface server includes at least a called party number, although the call data may also include a call start data, a call start time, a call stop date and a call stop time. The interface server may calculate a call duration based on the call data. The call log data received and stored by the outgoing call log database would further include the call duration. The interface server may receive additional information, including at least a called party name corresponding to the called party number. The web server may then display at the web client at least the called party name, the called party number and the call duration.

In an aspect of the present invention, the system for providing outgoing call log data further includes the web server enabling the subscriber to initiate a repeat telephone call to the called party number by selecting the called party number from the display at the web client. The web server may store at least the called party name and the called party number in a personal directory database of the subscriber in response to the subscriber selecting the called party number from the display at the web client. The web server may also generate a report based on at least the outgoing call log data and display the report at the web client.

Another aspect of the present invention provides a system for providing an outgoing call log report based on multiple telephone calls from a subscriber's telephone. The system includes a first data network that receives from a public switched telephone network (PSTN) call data corresponding to the multiple telephone calls placed from the subscriber's telephone in the PSTN. The first data network includes an interface server that receives the call data from the PSTN through a data interface and obtains additional information from a directory database corresponding to the call data, as well as an outgoing call log database that stores outgoing call log data, which includes a corresponding one of the call data and associated additional information received from the interface server. In an embodiment of the invention, the directory database is included in the PSTN.

The system further includes a second data network, which includes a web server. In response to a query from a web client, the web server retrieves the outgoing call log data from the outgoing call log database, generates a report based at least on the outgoing call log data and displays at least the generated report at the web client. The second data network may include the Internet.

The additional information obtained by the interface server from the directory database may include multiple called party names associated with the call data received from the PSTN. Also, the data received by the interface server from the PSTN may include a called party number, a start date, a start time, a stop date and stop time associated with each of the multiple telephone calls from the subscriber's telephone. The interface server calculates a call duration associated with each of the multiple telephone calls from the subscriber's telephone. The outgoing call log data stored by the outgoing call log database may then further include the call duration for each of the plurality of telephone calls.

Another aspect of the present invention provides a method for providing outgoing call log data associated with a telephone call from a subscriber's telephone. The method includes launching a query from a switch in response to a preset AIN trigger. The query relates to the telephone call from the subscriber's telephone and is received at a service control point. The call data is related to the telephone call and may include a called party number. The call data is forwarded to an interface server via a data interface. Additional information from a directory database is retrieved based on at least the call data, and may include a called party name. At least the call data and the additional information are stored in an outgoing call log database as the outgoing call log data. The outgoing call log data is provided from the outgoing call log database to a web server in response to a query from a web client associated with the subscriber. The outgoing call log data is sent to the web client. Furthermore, the telephone call may continue to be processed after launching the query to the service control point.

The method may also include calculating a call duration based on the call data received by the interface server. The call data would further include a call start date, a call start time, a call stop date and a call stop time. The additional information received by the interface server may also include at least a called party name corresponding to the called party number. The called party name, the called party number and the call duration may be displayed at the web client. Also, a repeat telephone call to the called party number may be initiated by selecting the called party number from the display at the web client. The called party name and the called party number may be stored in a personal directory database of the subscriber by selecting the called party name from the display at the web client. Also, an outgoing call log report may be generated based on at least the outgoing call log data. The outgoing call log report is displayed at the web client.

Another aspect of the present invention provides a method for providing outgoing call data associated with a telephone call from a subscriber telephone to a called party where the outgoing call data is provided over multiple networks to the subscriber at a graphical user interface. The method includes storing the outgoing call data in an outgoing call log database in response to the telephone call from the subscriber telephone; receiving a query from the subscriber through at least one of the multiple networks; retrieving the outgoing call data from the outgoing call log database in response to the query; and transmitting the outgoing call data to the subscriber through at least two of the multiple networks. At least one of the multiple networks may include a packet switched data network and at least one of the packet switched data networks may be the Internet.

An AIN trigger may be initially launched when the telephone call from the subscriber telephone is placed. The storing of the outgoing call data is then initiated in response to the AIN trigger. It may first be determined whether the subscriber has activated a service for providing the outgoing call data.

The storing of the outgoing call data may further include obtaining, at a service control point, called party data from a service switching point. The called party data includes at least a telephone number associated with the called party. The called party data is transmitted from the service control point to a server by way of a GDI client. Additional information associated with the called party data is obtained from a directory database. The additional information includes at least a name associated with a telephone number of the called party. The called party data and the additional information is transmitted from the server to the outgoing call log database and stored as the outgoing call data.

The present invention is an AIN based telecommunications system and method that enables an outgoing call log (OCL) service. The outgoing call log is accessible through the PSTN, as well as data communication networks, such as the Internet and other packet switched type networks. The outgoing call log is automatically populated by called party data whenever a call is placed in the PSTN from an OCL subscriber's telephone. The outgoing call log is interactively accessible through a graphical user interface (GUI) by the subscriber over the Internet, for example, enabling the subscriber to review the data, generate reports, add entries to a personal directory and place repeat telephone calls.

FIG. 1 illustrates an exemplary telecommunications network (e.g., the PSTN) in association with the present invention. The exemplary network includes a subscriber telephone 10 (i.e., the calling party telephone), an originating service switching pont (SSP) 14, a terminating SSP 16 and a called party telephone 12. The network also includes a conventional signaling transfer point (STP) 32 and service control point (SCP) 30. By way of example, the SCP 30 may be implemented with the Bellcore Integrated Service Control Point, loaded with ISCP software Version 4.4 (or higher), available from Telecordia, Murray Hill, N.J.

The SSP 14 is the originating central office (CO) for the subscriber telephone 10 and the SSP 16 is the terminating CO for the called party telephone 12. However, the terminating CO and the originating CO may be the same, or there may be any number of intervening switches routing the connection between the subscriber telephone 10 and the called party telephone 12. The SSPs 14 and 16 include, for example, 1AESS or 5ESS switches manufactured by Lucent Technologies, Inc., or DMS-100 switches manufactured by Nortel Networks Corporation (Nortel), or AXE-10 switches manufactured by Telefonaktiebolaget LM Ericsson.

The 1AESS switches may use an AIN Release 0.1 protocol and should be equipped with Generic 1AE13.01 (or higher) software and associated AIN SSP features. The 5ESS switches may utilize an AIN Release 0.1 protocol and should be equipped with Generic 5E12 (or higher) software and associated AIN SSP features. The DMS-100 switches (release NA009) may utilize an AIN Release 0.1 protocol and associated AIN SSP features. The AXE-10 switches may utilize an AIN Release 0.1 protocol and should be equipped with Generic 8.07 (or higher) software and associated AIN SSP features. The call service logic of the present invention may be upgraded to accommodate future AIN releases and protocols and future trigger types. Specifications of AIN Release 0.1 SSPs may be found in Bellcore *TR-NWT-001285, Switch-Service Control Point Application Protocol Interface Generic Requirements*, the disclosure of which is expressly incorporated by reference herein in its entirety.

FIG. 1 further depicts an exemplary data network, associated with the telecommunications network described above, that includes a web client 20, connectable through the Internet 40, or other packet switched data network, to a web server 42. The web client 20 includes a GUI 22 and associated operating software 24. FIG. 1 indicates the web client 20 being directly connected to the Internet, for example, through a digital subscriber line (DSL) or integrated services digital network (ISDN) digital connection. However, any conventional Internet access may be used, including an analog dial-up connection, through a modem (not pictured) on the subscriber's telephone line and the SSP 14.

The data network also includes an OCL server 34, which is an interface server connected to the SCP 30 through, for example, a Bellcore Generic Data Interface (GDI) client 31.

Generally, the OCL server 34 interfaces with the GDI client 31, facilitating communication between the PSTN and the data network. Both the web server 42 and the OCL server 34 are connected to an OCL database 36 within the data network. The OCL database 36 is a standard relational database, such as those available from Oracle Corporation or Sybase, Inc., and contains account information and call log data of the outgoing call log subscribers. The OCL server 34 is also connected to a directory database 38 (i.e., a name and number database), which includes the applicable universe of telephone numbers and associated names in at least a portion of the PSTN. Although not shown, the SCP 30 can be directly connected to the directory database 38 instead of through the OCL server 34. The directory database 38 may be a line information database (LIDB), which is maintained independently of the PSTN and updated appropriately by the service provider to assure provision of current information. The invention may include any comparable publicly or privately maintained database, including a Lucent LDAP database and server.

When accessing outgoing call information using the Internet, the subscriber accesses the web server 42 using the GUI 22, which may be, for example an IBM Pentium based personal computer running Microsoft Windows operating system, available from Microsoft Corporation, Inc. In an embodiment, the web client software 24 incorporates a web browser, such as Microsoft Internet Explorer, Netscape Navigator or HotJava, available from Sun Microsystems, Inc. An embodiment of the invention with respect to the web server 42 includes running Linux or Microsoft Windows operating system and Apache web server software, available from the Apache Software Foundation, or Jigsaw web server software, available from World Wide Web Consortium (W3C).

Figure 2:
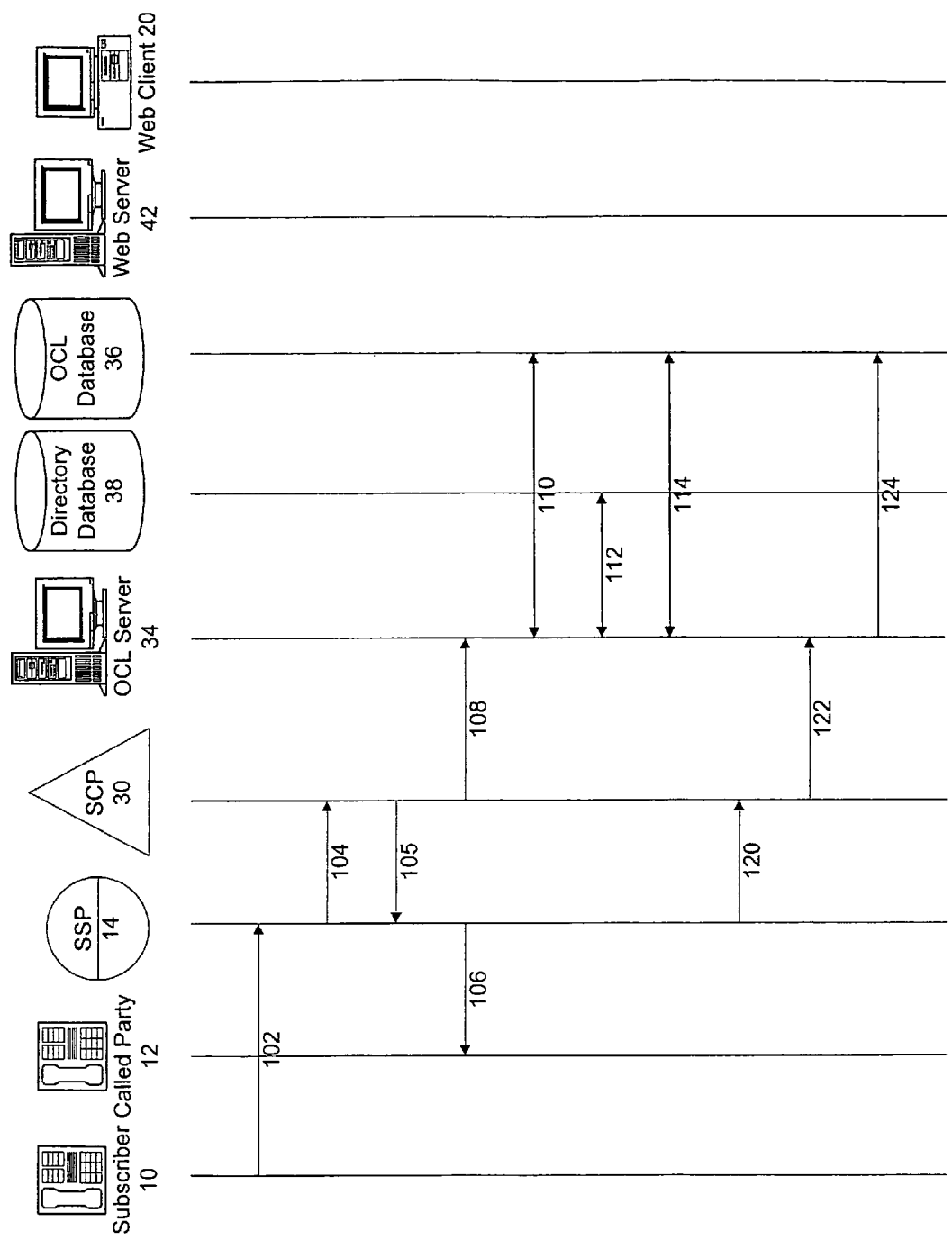
FIG. 2 is an exemplary call flow diagram illustrating the process of accessing and storing outgoing call data in an OCL database, according to an aspect of the present invention.

FIG. 2 is an exemplary call flow diagram depicting the subscriber placing a call from subscriber telephone 10 and thus automatically invoking the outgoing call log service. As shown at step 102, the subscriber telephone 10 is connected to the local SSP 14 whenever the subscriber telephone 10 goes "off-hook," (i.e., the handset is removed from the cradle or is otherwise activated to receive a dial tone). The outgoing call log service is initiated at this point by an AIN off-hook delay (OHD) trigger, which has been previously set in SSP 14 upon service activation. The SSP 14 launches the OHD trigger each time the subscriber phone goes off-hook and a series of digits adhering to the switch's dial plan is dialed.

At step 104, the OHD trigger activated by the SSP 14 causes call data to be sent to the SCP 30 for processing, via the existing signaling system 7 (SS7) network (and appropriate STP 22), in a known manner. The call data includes the called party number and the calling party number.

Significantly, the telephone call is not suspended at the SSP 14 switch during execution of the outgoing call log service. Rather, the call completes in a normal fashion based, in part, on any instructions from the SCP 30 at step 105 to the originating SSP 14, and/or the terminating SSP 16 (not shown in FIG. 2). For example, the subscriber and the called party may subscribe to additional AIN based telephony services that may be activated by call placement or receipt. These services would continue to be processed during execution of the outgoing call log service. The call is completed at step 106, connecting the subscriber telephone 10 with the called party telephone 12 through at least the originating SSP 14.

While the telephone call is being processed and routed, the SCP 30 interfaces with the data network, which functions separately from the PSTN. In an embodiment of the invention, the interface between the SCP 30 and the data network is the Bellcore GDI client 31. This interface provides the capability to send and receive transactions to and from external systems using known transmission control protocol/internet protocol (TCP/IP) with transaction capabilities application part (TCAP) messages. The GDI client 31 therefore enables the SCP 30 to generate messages to request data, send data or invoke an application (InvokeApp) to the OCL server 34.

As shown in step 108 of FIG. 2, the SCP 30 sends an InvokeApp message to the OCL server 34 via the GDI client 31 (not pictured in FIG. 2). The InvokeApp message may include the calling party number, the called party number, the call type and the call date and time. As stated above, by invoking an interface server external to the PSTN, the SCP 30, the SSP 14 and other PSTN resources may continue processing the call without having to await execution of the outgoing call log service.

When the OCL server 34 receives the InvokeApp message from the SCP 30 via the GDI client 31, it first confirms at step 110 that the outgoing call log service is active. Ordinarily, the outgoing call log service is continually active from the time the service is implemented on behalf of the subscriber. However, in an embodiment of the invention, the subscriber may selectively activate and deactivate the outgoing call log service as desired, using the web client 20 via the Internet 40, as discussed below, or using a conventional dual tone multi-frequency (DTMF) telephone via an interactive voice response (IVR) system, as discussed, for example, in U.S. patent application Ser. No. 09/619,312, filed on Jul. 19, 2000, the disclosure of which this application hereby incorporates by reference in its entirety. By confirming an active status, the OCL sever 34 avoids unnecessary processing time in the event the service has been discontinued or is temporarily OFF.

The confirmation step 110 is an interaction between the OCL server 34 and the OCL database 36. The OCL database 36 contains data relating to the subscriber's account, including an active/inactive status indicator and the outgoing call log itself. The OCL server 34 and the OCL database 36 communicate with one another using Java database connectivity (JDBC), although any appropriate interface may be used, such as open database connectivity (ODBC). The OCL server 34 queries the OCL database 36 for status information. An inactive indication terminates the outgoing call log process.

The OCL server 34 also interfaces with the directory database 38 at step 112 to determine the name associated with the called party number provided by the SCP 30 at step 108. As discussed above, the directory database 38 may be an external LIDB maintained independently of the PSTN and updated appropriately by the service provider to assure current information. Alternatively, the directory database 38 may be a publicly maintained database that is part of the PSTN. Once the called party name is retrieved from the directory database 38, the OCL server 34 instructs the OCL database 36 to store the call related information in association with the subscriber's account, including the called party number, the retrieved called party name and the time and date the call was placed.

In one embodiment of the invention, the outgoing call log service is implemented along with a personal directory service, such as the personal directory service described, for example, in conjunction with Personal Call Manager (PCM), as disclosed in U.S. patent application Ser. No. 09/619,312, filed on Jul. 19, 2000. A subscriber's personal directory includes at least names and telephone numbers that the subscriber has elected to enter into a personal database, which may be stored at another external database accessible by the OCL server 34, as well as the web server 42. If the OCL server is unable to retrieve a name associated with a called party number from the directory database 38 (e.g., the called party is located in a region outside the scope of the particular directory database), the OCL server 34 is able to query the personal directory database as a secondary attempt to retrieve the name associated with the called party number. Alternatively, because of the likelihood that the subscriber is calling someone already in the personal directory, the OCL server 34 may query the personal directory database before querying the directory database 38 to obtain the called party name. By querying the personal directory database first, the OCL server 34 may possibly avoid the step of communicating with the directory database 38 altogether, thus increasing processing efficiency. Furthermore, the name retrieved from the personal directory database would reflect the subscriber's customized preference, so that the outgoing call log would include terms, such as "dad," opposed to impersonal, proper names for close friends and family members.

Alternative embodiments of the invention combine the various server and database functions described above into any practical combination of PSTN and data network systems. For example, the directory database 38, i.e., the LIDB, may be internal to the SCP 30. One advantage of an internal directory is that the PSTN provider would have the responsibility of maintaining a current database of names associated with the applicable universe of telephone numbers. In this embodiment, the called party name would be among the information in the InvokeApp message sent by the SCP 30 to the OCL server 34, via the GDI client 31, at step 108 of FIG. 2. Obviously, the OCL server 34 would then skip querying the directory database 38 at step 112. Alternatively, the OCL server 34 could store the information of the directory database 38 (as well as the OCL database 36) in an internal memory, depending on the demands of the service and limitations of the OCL server 34. Otherwise, the SCP 30 could communicate directly with the directory database 38 to obtain the information.

Moreover, the functions of the OCL server 34 and/or the OCL database 36 may be performed entirely by the SCP 30, thereby eliminating the need for the corresponding external network elements and promoting efficiency of the outgoing call log process. However, the SCP 30 would incur the additional burden of processing the outgoing call log service, including associating names and telephone numbers, adding new entries to the outgoing call log and interfacing with the subscriber via the Internet. Interfacing with the subscriber would require additional network resources, such as an intelligent peripheral to translate data messages into a standard protocol, e.g., SR-3511, and otherwise enable communication between the web server 42 and the SCP 30.

When the call is terminated, the SSP 14 activates an appropriate signaling message, such as an intelligent network disconnect trigger, which is sent to the SCP 30 at step 120. The SCP 30 notes the date and time of call termination and passes this information to the OCL server 34 via the GDI client 31 at step 122. The OCL server 34 calculates the call duration and sends the stop date, the stop time and the calculated call duration to the OCL database 36. The OCL database 36 stores the information in the subscriber's account, along with the associated start date, start time and called party name and number, previously stored by the OCL database 36.

Figure 3:
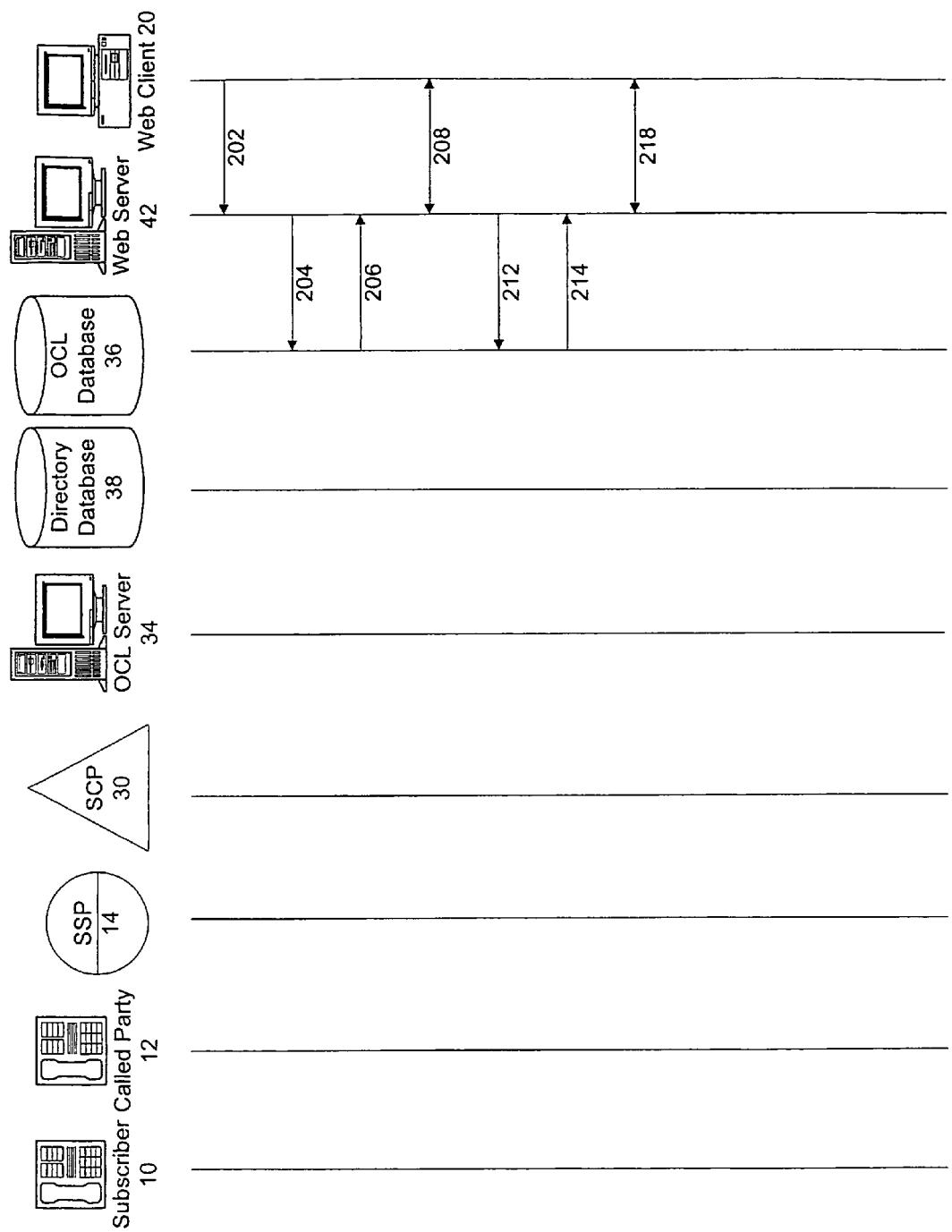
FIG. 3 is an exemplary call flow diagram illustrating the process of accessing and interacting with the OCL database via the Internet, according to an aspect of the present invention.
Figure 4:
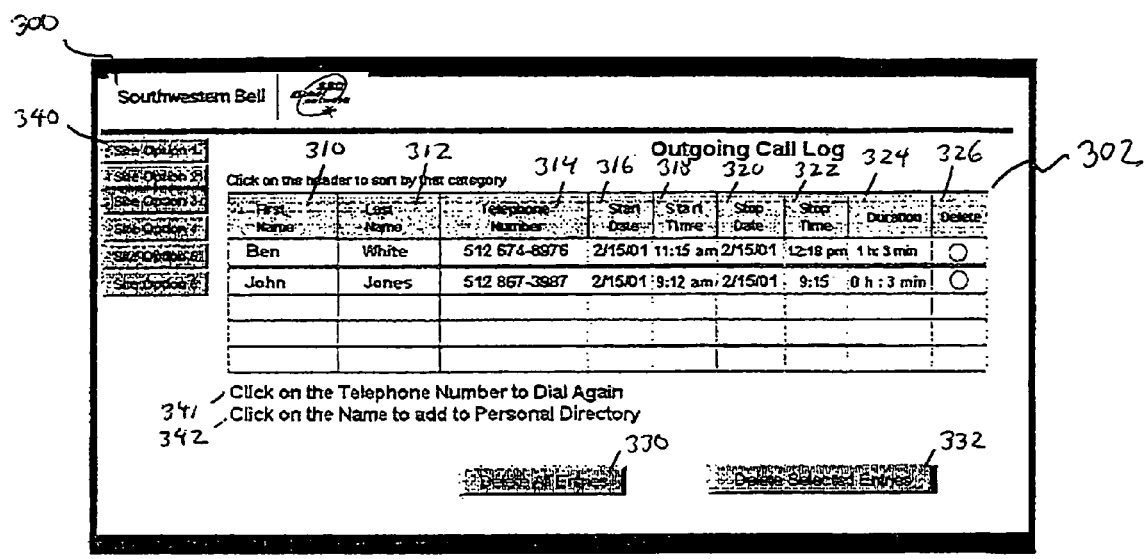
FIG. 4 is an exemplary outgoing call log window displaying called party information for a selected account number at the subscriber's personal computer, or other graphical user interface, according to an aspect of the present invention.

According to the invention, the subscriber is able to access his or her outgoing call log data stored in the OCL database 36 through a data network, independently of PSTN involvement. FIG. 3 is an exemplary call flow diagram depicting an embodiment of the invention in which the subscriber accesses the outgoing call log data over a packet switched data network using the GUI 22 of web client 20. At step 202, the subscriber accesses the web server 42 through the Internet 40 from the web client 20, using a web browser such as Microsoft Internet Explorer, Netscape Navigator or HotJava. The web server 42 serves as a secure access platform, receiving hypertext transfer language protocol (HTTP) messages from the web client 20 and providing hypertext mark-up language (HTML) web pages in response to the subscriber's input. The web pages relate to the subscriber's outgoing call log service account, an example of which is depicted in FIG. 4, discussed below. In alternative embodiments of the invention, the subscriber may connect to the OCL database 36 from web client 20 or through the OCL server 34 or any number of intervening web servers.

Once connected to the web server 42, the subscriber accesses the OCL database 36 in order to log-in to the subscriber's personal outgoing call log service account. The log-in process may include authentication of the subscriber to protect the privacy of the subscriber's outgoing call information. To perform the authentication, the web server 42 contacts the OCL database 36 at step 204, which recognizes the access request. The OCL database 36 retrieves the subscriber's account information, which includes the authentication data, and sends the account information to the web server 42 for processing at step 206. The authentication data may include the subscriber's name, account number, personal identification number (PIN) and/or password.

In an alternative embodiment, the subscriber's authentication data is stored at an authentication/subscription information (ASI) server separate from the OCL database 36. Implementation of the separate ASI server enables the telecommunications service provider to consolidate authentication processing of a variety of telecommunications services. For example, the outgoing call log service may be offered as part of, or in addition to, a PCM service, as discussed for example in U.S. patent application Ser. No. 09/619,312, filed on Jul. 19, 2000. A shared ASI server reduces redundant data storage and otherwise promotes processing efficiency of all of the services involved.

Upon receiving the authentication data from the OCL database 36, the web server 42 prompts the subscriber to enter the matching data from the web client 20 at step 208 of FIG. 3, which indicates an ongoing interaction between the web server 42 and the web client 20. In other words, the web server 42 causes the display of various web screens at the GUI 22 of the web client 20, to which the subscriber responds. When the entered data does not match the stored authentication data, the web server 42 denies access to the requested account, possibly after allowing repeat attempts, depending on the programming choices of the service provider.

When the entered data matches the stored authentication data, the web server 42 queries the OCL database 36 at step 212 and retrieves the substantive outgoing call log data associated with the subscriber's account at step 214. The web server 42 displays consecutive web screens indicating the outgoing call log service and displaying the subscriber's personalized data. The subscriber can thus interact with his or her outgoing call log service account, indicated by step 218. Alternatively, the web server 42 retrieves the authentication data and the substantive outgoing call log information in a single step to eliminate, for example, processing steps 212 and 214, although the outgoing call log information is not provided to the web client 20 until after successful subscriber authentication. The process indicated by FIG. 3 enables the subscriber to access the outgoing call log information from any location with networking facilities that allow connection to the data network, whether it is the Internet, a corporate intranet or other TCP/IP network.

As discussed above, in an embodiment of the invention, the subscriber's account information, including names and telephone numbers of the outgoing call log entries, are stored at the SCP 30. From a subscriber interaction standpoint, however, a separate, external OCL database 36 would likely function more efficiently. For example, the subscriber may access account information without waiting for availability of the SCP 30, which may be handling numerous telephone calls and other traffic in the PSTN environment.

An exemplary customized outgoing call log web screen 300 is depicted in FIG. 4. The outgoing call log web screen includes a table 302 with nine vertical columns to accommodate various call data. The first three columns contain the first and last names of the called party and the corresponding telephone number, indicated by 310, 312 and 314, respectively. The names appear as they are stored in the directory database 38 or the personal directory database from which the OCL server 34 originally retrieved the party name during call placement based on the telephone number. In an embodiment of the invention, the web screen 300 includes another column entitled "comments," for example, in which the subscriber is provided additional information about each listed party retrieved, for example, from the personalized directory database, described above.

The fourth and fifth columns of the table 302 contain the start date 316 and the start time 318 of the outgoing telephone call. Similarly, the sixth and seventh columns contain the stop date 320 and the stop time 322 of the same telephone call. The duration 324 of the call is summarized at the next column for the subscriber's convenience. The call duration is retrieved from the OCL database 36, although alternatively, the web server 42 may calculate the call duration from the retrieved start and stop data, in the event the OCL server 34 has not be programmed to calculate call duration prior to sending the stop date and time to the OCL database 36 at step 124 of FIG. 2. The call duration related information is displayed in columns 316 to 324 to provide the specific call history to the subscriber.

The outgoing call data enables the creation of call reports, which the subscriber may request through the web server 42. Such call reports include, for example, a summary of calls to a particular number and the associated charges, if available from the service provider. Call reports may also include various combinations and summaries of all outgoing call information, in the form of graphs, pie charts, bar charts and the like. For example, a report format may present a pie chart showing the proportion of calls to particular telephone numbers over a specified period of time. Another report format may present a graph indicating local versus long distance calls.

With respect to the extent of reports available, the service provider may offer incremental levels of outgoing call log service privileges. For example, a basic outgoing call log service includes only the information in the table 302 of FIG. 4 with no report generating capability. A mid-range service includes minimal reports, such as summaries of call data to a particular telephone, and other standard reports. A deluxe outgoing call log service provides a full range of reports and graphics, including the ability to create customized reports having subscriber directed formats.

The final column shown in the table 302 is the delete column 326. The subscriber simply indicates the desired deletion of a line entry by selecting the delete button in the delete column 326, or otherwise highlighting the delete button. Once the subscriber has selected the entries to deleted, he or she selects box 332, entitled "delete selected entries" to remove the selected line items from the table 302. When the subscriber wants to delete all entries in the table 302, he or she alternatively selects box 330, entitled "delete all entries." If no delete command is executed by the subscriber, the outgoing call log data remains in the table 302 and will continue to be displayed pursuant to further request data commands until a delete command is sent or until some predetermined drop time expires, for example, 30 days. In one embodiment, the drop time may be adjusted by the subscriber. Also, the line entries in table 302 are eliminated in chronological order as the table 302 reaches a predetermined maximum capacity, such as 100 line entries.

Note that deleting entries from the outgoing call log table 302 may not delete the corresponding data from the OCL database 36 or the historical calling record, which would require a separate command from the subscriber. Although not indicated at web screen 300, the outgoing call log service maintains a record of the duration related data of all outgoing telephone calls at the OCL database 36 until a predetermined period of time has elapsed, e.g., three months, or the subscriber chooses to delete the information. Saving the information enables generation of outgoing call data reports, discussed above.

Block 340 of FIG. 4 provides a series of six option indicators. Selection of an option indicator retrieves another web screen from the web server 42 for display at the web client 20. The specific options available to the subscriber depend on the level of service to which the subscriber subscribes, as discussed above. For example, the deluxe outgoing call log service may include changing authentication data (e.g., the subscriber password) as option 1, activating and deactivating the outgoing call log service as option 2, reviewing historical outgoing call records as option 3, creating standard outgoing call reports as option 4, and creating customized outgoing call reports as option 5. Option 6 may provide, for example, links to other personal AIN based call services of the subscriber, such as a personal directory, or return to a PCM home page or menu.

The web screen 300 of FIG. 4 further includes instructions to the subscriber in regard to the entries in table 302. For example, instruction 341 states, "Click on the Telephone Number to Dial Again." Following this instruction, the subscriber may initiate a telephone call to a telephone number indicated in column 314 by simply clicking on the number. Using known techniques, the web server 42 then initiates a connection over the PSTN from the subscriber telephone 10 or over the existing data network connection from the web client 20 using, for example, Voice Over Internet capability. Instruction 342 states, "Click on the Name to add to Personal Directory." Following this instruction, a subscriber who also has personal directory privileges from the service provider may add the name and telephone number of a line item from table 302 to the personal directory. Additional instructions may be displayed on web screen 300, for example, enabling the subscriber to populate a database dedicated to personal digital assistant (PDA), e.g., a Palm VIIx, available from Palm, Inc., with the outgoing call log data.

In another embodiment of the invention, the subscriber's personal directory may be populated automatically by the outgoing call log service. For example, the OCL server 34 is programmed to track the number of times called party numbers are dialed from the subscriber telephone 10. When a particular called party number is identified as being called frequently, e.g., at least three times within a predetermined time period, the OCL server 34 accesses the database containing the subscriber's personal directory and adds the frequently called telephone number and associated name, unless they are already listed. The web screen 300 may then include, for example, an instruction enabling the subscriber to view the list of newly added frequently called telephone numbers.

Figure 5:
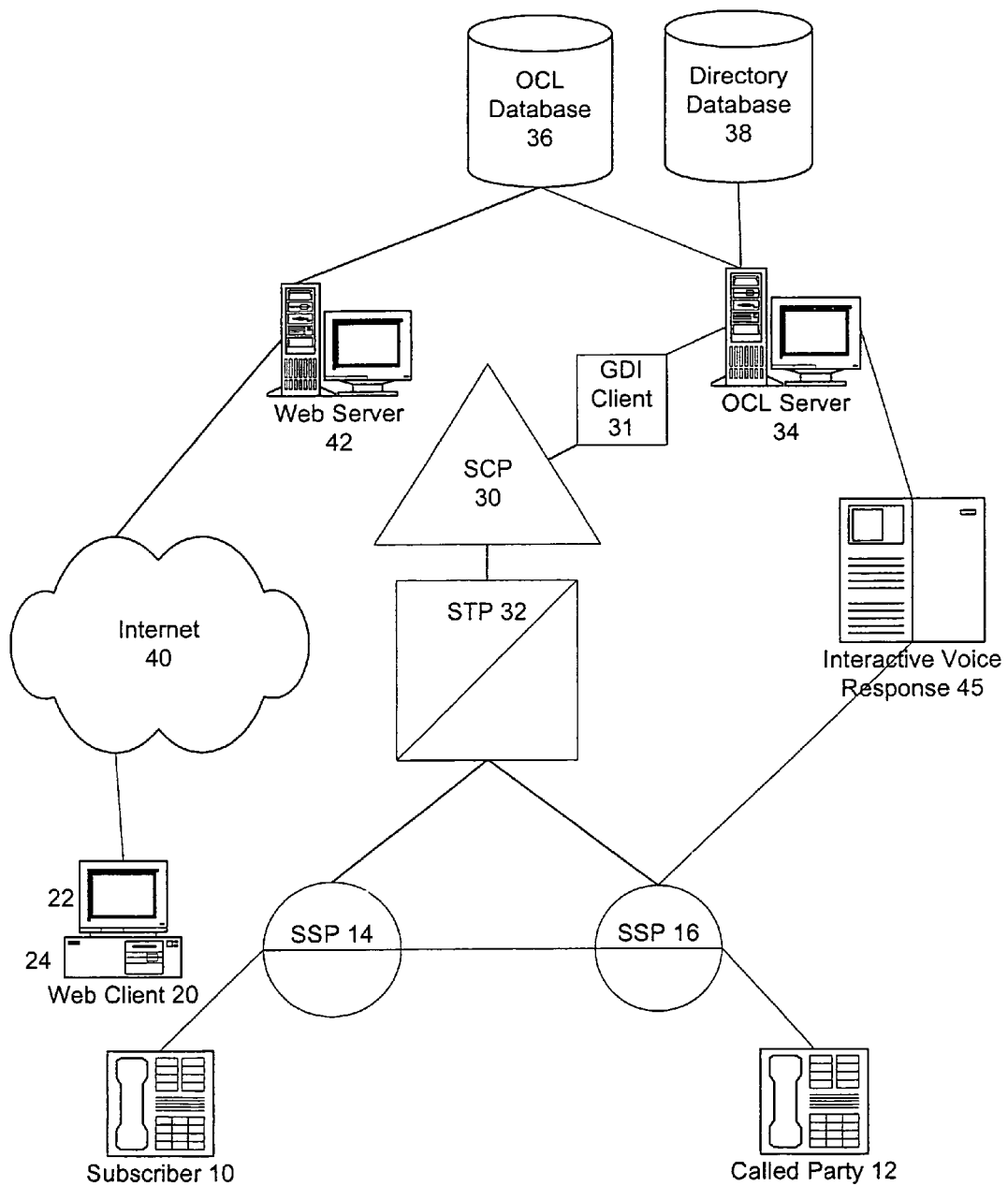
FIG. 5 is a block diagram illustrating system components, including an interactive voice response, according to an aspect of the present invention.

As stated above, an embodiment of the invention enables the subscriber to access the outgoing call log service via an IVR, as well as via the Internet, thereby greatly increasing flexibility and convenience. FIG. 5 is a block diagram illustrating exemplary system components, including an IVR 45. The other PSTN and data network components depicted in FIG. 5 are the same as those previously discussed in regard to FIG. 1. The IVR 45 is connected to the SSP 16 and the OCL server 34, enabling access to the OCL database 36 from the subscriber telephone 10. The IVR 45 may be, for example, available under the trademark CONVERSANT System for IVR, Version 6.0, Update 1, provided by Lucent Technologies, Inc. The network alternatively incorporates any compatible stand-alone IVR or advanced intelligence network-intelligent peripheral (AIN-IP or intelligent peripheral) providing an IVR.

Access to the outgoing call log service through the IVR 45 is limited in that the subscriber cannot create reports, for example. However, the subscriber can access many features of the outgoing call log service, including audibly reviewing basic outgoing call log data, changing authentication data (e.g., the subscriber password) and activating and deactivating the outgoing call log service.

To use the IVR, the subscriber calls a predetermined telephone number, e.g., a toll free number, from any DTMF telephone, such as the subscriber telephone 10. The subscriber thus accesses the IVR 45 through conventional switches, such as SSP 14 and SSP 16. The IVR 45 receives the call and initiates a request for various authentication information, including account number, PIN and/or password. These numbers coincide with the authentication data used to access the outgoing call log service via the Internet 40, as described above. The pre-programmed voice announcements reside in the IVR 45, the implementation of which is well known. The authentication data is provided by the subscriber using the touch tones of the subscriber telephone 10. The IVR 45 forwards the information to the OCL server 34, which queries the OCL database 36 for verification.

After verification, the OCL server 34 retrieves the current data for the outgoing call log service, including generally the information shown in table 302 of FIG. 4, and provides the data to the IVR 45. The IVR 45 verbally recites a menu of options to the subscriber, which may include changing authentication data, toggling the service ON and OFF and receiving outgoing call data. The subscriber listens to the options and inputs the selections via the telephone touch tone key pad. If the command includes receiving the outgoing call data, the IVR 45 provides an abbreviated listing of data, as dictated by system capabilities, that includes, for example, called telephone numbers and corresponding dates and times for call duration. In an embodiment, the IVR 45 may be programmed to request a specific telephone number and provide the corresponding call data for the subscriber to review. Any changes to the data are forwarded from the IVR 45 to the OCL server 34, which updates the OCL database 36, if necessary.

The IVR 45 may be incorporated into the outgoing call log service as shown, for example, in U.S. patent application Ser. No. 09/619,312, filed on Jul. 19, 2000. If the functionality of the OCL server 34 and/or the OCL database 36 resides in the SCP 30, the IVR 45 may be incorporated into an intelligent peripheral, which interfaces with the SCP 30 using SR-3511 protocol signaling or the like. The form of implementation would be invisible with respect to subscriber interaction.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, HTML), and public telephone networks (ISDN, ATM, xDSL) represent examples of the state of the art. Such standards are periodically superseded by faster or more efficient equivalents having essentially the same functions. Accordingly, replacement standards and protocols having the same functions are considered equivalents.

What is claimed:

1. A system for providing outgoing call log data associated with a call from a subscriber's terminal, the system comprising:
   a service controller that receives a query from a switch in response to the call, and forwards call data to an interface server in response to the query, the interface server obtaining additional information from a directory database based on at least the received call data; and
   an outgoing call log database that receives and stores the call data and the additional information from the interface server as the outgoing call log data;
   wherein the outgoing call log data is retrievable from the outgoing call log database via a web server, in response to a query from a web client.

2. The system for providing outgoing call log data according to claim 1, wherein the switch continues to process the telephone call after querying the service controller.

3. The system for providing outgoing call log data according to claim 1, the call data received by the interface server comprising at least a called party number.

4. The system for providing outgoing call log data according to claim 3, the call data received by the interface server further comprising a call start date, a call start time, a call stop date and a call stop time;
   wherein the interface server calculates a call duration based on the call data and wherein the call log data received and stored by the outgoing call log database further comprises the call duration.

5. The system for providing outgoing call log data according to claim 4, the additional information received by the interface server comprising at least a called party name corresponding to the called party number.

6. The system for providing outgoing call log data according to claim 5, wherein the web server displays at the web client at least the called party name, the called party number and the call duration.

7. The system for providing outgoing call log data according to claim 6, wherein the web server enables the subscriber to initiate a repeat call to the called party number by selecting the called party number from the display at the web client.

8. The system for providing outgoing call log data according to claim 5, further comprising a personal directory database that stores at least the called party name and the called party number in response to the subscriber providing the called party name in association with the called party number at the web client.

9. A method for providing outgoing call log data associated with a call from a subscriber's terminal, the method comprising:
   receiving call data from a service controller in response to the call from the subscriber's terminal via a data interface, the call data being related to the call;
   retrieving additional information from a database based on at least the call data; and
   storing at least the call data and the additional information as the outgoing call log data,
   the outgoing call log data being accessible to a web client associated with the subscriber via a web server.

10. The method for providing outgoing call log data according to claim 9, wherein the call continues to be processed by the service controller.

11. The method for providing outgoing call log data according to claim 9, wherein the call data comprises at least a called party number.

12. The method for providing outgoing call log data according to claim 11, further comprising calculating a call duration based on the received call data, wherein the call data further comprises a call start date, a call start time, a call stop date and a call stop time.

13. The method for providing outgoing call log data according to claim 11, the additional information comprising at least a called party name corresponding to the called party number.

14. The method for providing outgoing call log data according to claim 13, in which the additional information database comprises at least one of a public directory database and a personal database of names associated with directory numbers, the method further comprising:
retrieving the called party name associated with the called party number from the personal database when the called party number is in the personal database.

15. The method for providing outgoing call log data according to claim 14, further comprising:
retrieving the called party name associated with the called party number from the public directory database when the called party number is not in the personal database.

16. The method for providing outgoing call log data according to claim 12, wherein the called party name, the called party number and the call duration are displayed at the web client.

17. The method for providing outgoing call log data according to claim 16, further comprising initiating a repeat call to the called party number by receiving a selection of the called party number from the display at the web client.

18. A computer readable medium that stores a program for providing outgoing call log data associated with a call from a subscriber's terminal to a called party number, the computer readable medium comprising:
a receiving code segment that receives call data from a network service controller in response to the call from the subscriber's terminal, the call data being related to the call;
a retrieving code segment that retrieves additional data from at least one database based on at least the call data; and
a storing code segment that causes at least the call data and the additional data to be stored as the outgoing call log data, the outgoing call log data being accessible to a web client associated via a web server.

19. The computer readable medium of claim 18, further comprising:
a calculating code segment that calculates a call duration based on the received call data, wherein the call data further comprises a call start date, a call start time, a call stop date and a call stop time.

20. The computer readable medium of claim 18, wherein the at least one database comprises a public directory database and a personal database of names associated with directory numbers, and
wherein the additional data comprises a called party name associated with the called party number, the called party name being retrieved from the personal database when the called party number has been previously stored in the personal database and retrieved from the public directory database when the called party number has not been previously stored in the personal database.

* * * * *